(12) United States Patent
Wang et al.

(10) Patent No.: US 12,156,168 B2
(45) Date of Patent: Nov. 26, 2024

(54) NETWORKING AND POSITIONING METHOD, SYSTEM AND DEVICE, AND STORAGE MEDIUM

(71) Applicants: Gree Electric Appliances, Inc. of Zhuhai, Guangdong (CN); Leayun Technology Co., Ltd. of Zhuhai, Guangdong (CN)

(72) Inventors: Lifu Wang, Guangdong (CN); Zehan Tan, Guangdong (CN); Yanyu Chen, Guangdong (CN); Ru Li, Guangdong (CN); Xiaojian Li, Guangdong (CN); Qi Cai, Guangdong (CN); Shengshi Ye, Guangdong (CN); Bo Sun, Guangdong (CN)

(73) Assignees: Gree Electric Appliances, Inc. of Zhuhai; Leayun Technology Co., Ltd. of Zhuhai

( * ) Notice: Subject to any disclaimer, the term of this patent is extended or adjusted under 35 U.S.C. 154(b) by 351 days.

(21) Appl. No.: 17/770,442

(22) PCT Filed: Aug. 11, 2020

(86) PCT No.: PCT/CN2020/108538
§ 371 (c)(1),
(2) Date: Apr. 20, 2022

(87) PCT Pub. No.: WO2021/077865
PCT Pub. Date: Apr. 29, 2021

(65) Prior Publication Data
US 2022/0394654 A1    Dec. 8, 2022

(30) Foreign Application Priority Data
Oct. 21, 2019    (CN) .......................... 201911002150.5

(51) Int. Cl.
*H04W 4/80*    (2018.01)
*H04W 64/00*    (2009.01)

(52) U.S. Cl.
CPC ............. *H04W 64/00* (2013.01); *H04W 4/80* (2018.02)

(58) Field of Classification Search
CPC ............................... H04W 64/00; H04W 4/80
(Continued)

(56) References Cited

U.S. PATENT DOCUMENTS

| | | |
|---|---|---|
| 2008/0136644 A1 | 6/2008 | McCorkle |
| 2017/0164315 A1 | 6/2017 | Smith |
| 2019/0182620 A1* | 6/2019 | Bordelon .............. G01S 5/0295 |

FOREIGN PATENT DOCUMENTS

| | | |
|---|---|---|
| CN | 103995251 | 8/2014 |
| CN | 106879067 | 6/2017 |

(Continued)

OTHER PUBLICATIONS

English translation CN105706470B (Year: 2019).*
(Continued)

*Primary Examiner* — Ted M Wang
(74) *Attorney, Agent, or Firm* — Fish & Richardson P.C.

(57) ABSTRACT

Provided are a networking and positioning method, system and device, and a storage medium. The method includes: acquiring, by means of Bluetooth communication, Bluetooth broadcast positioning data broadcast by a positioning master base station in a preset positioning region, a positioning beacon and the positioning master base station are each provided with a Bluetooth communication device; and networking and positioning the positioning beacon on the basis of the Bluetooth broadcast positioning data.

10 Claims, 6 Drawing Sheets

(58) Field of Classification Search
USPC .................................................. 455/456.1
See application file for complete search history.

(56) References Cited

FOREIGN PATENT DOCUMENTS

| CN | 107315166   | 11/2017 |         |
|----|-------------|---------|---------|
| CN | 107631732   | 1/2018  |         |
| CN | 109640268   | 4/2019  |         |
| CN | 109975758   | 7/2019  |         |
| CN | 105706470 B * | 8/2019 | ............ H04L 67/26 |
| CN | 209250893 U | 8/2019  |         |

OTHER PUBLICATIONS

CN Office Action in Chinese Application No. 201911002150.5, dated Aug. 30, 2021, 18 pages (with English Translation).
International Search Report in International Appln. No. PCT/CN2020/108538, dated Nov. 16, 2020, 5 pages (with English Translation).
International Preliminary Report on Patentability in International Appln. No. PCT/CN2020/108538, mailed on Apr. 26, 2022, 7 pages (with English translation).
Written Opinion in International Appln. No. PCT/CN2020/108538, dated Nov. 16, 2020, 6 pages (with English translation).

* cited by examiner

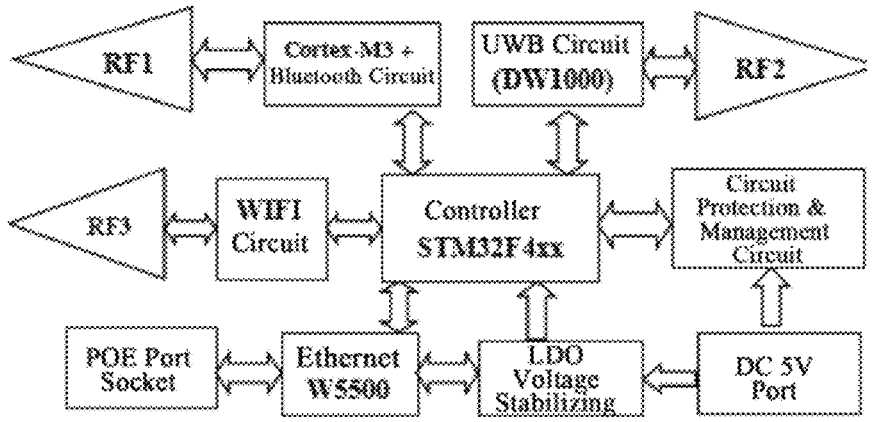
FIG. 2(c)
| Data Content of Bluetooth Broadcast Packet | | | |
|---|---|---|---|
| Received Bluetooth Signal Strength RSSI | ID number of Base Station | Latest Phase Time for networking | Moment At Which Master Base Station Broadcasts |
FIG. 3
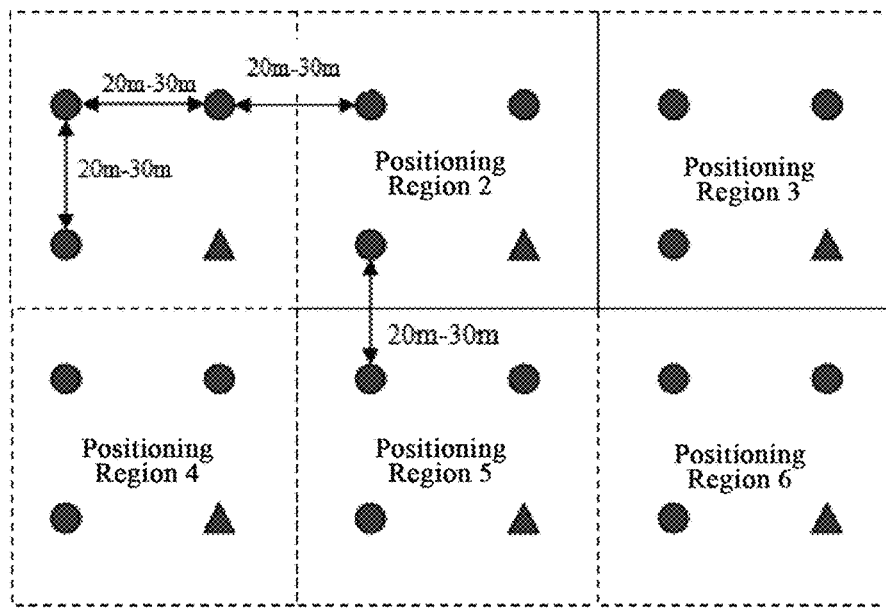
FIG. 4

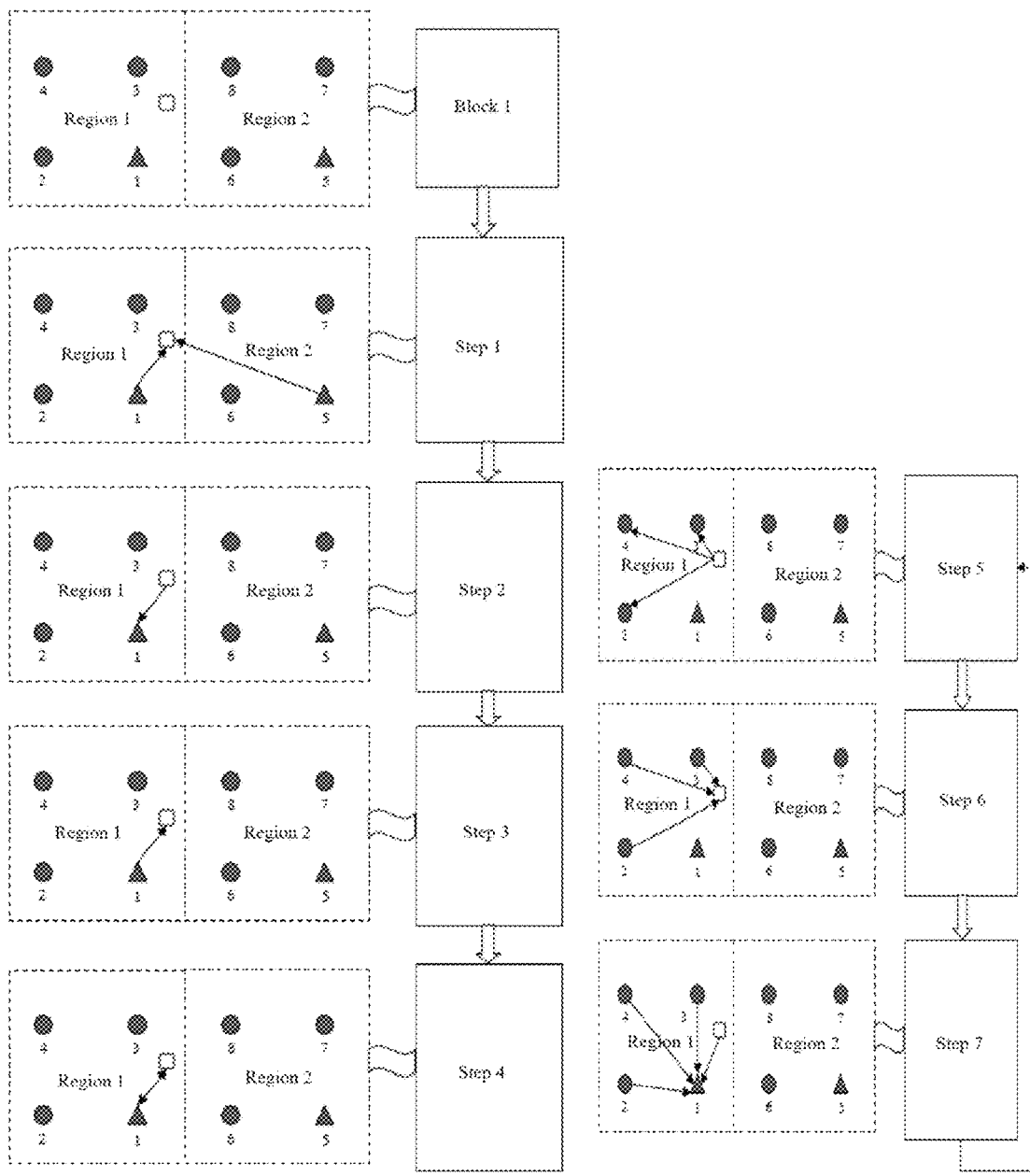

Block 1: Take the phase networking and positioning of beacons in two regions with 8 positioning base stations as an example, and begins with a step of networking of a new beacon.
Step 1: The beacon scans and receives the bluetooth signal data packet from a base station via Bluetooth, and acquires the base station 1 which has the strongest RSSI signal (the nearest one with the strongest signal).
Step 2: The beacon parses the Bluetooth broadcast data packet, calculates phase start time for networking, and when the time is up, the beacon sends a networking request to the base station 1 through a UWB signal.
Step 3: The base station 1 determines the networking and feeds back the networking success signal to the beacon, returns the phase offset error, and phase networking of the positioning beacon is completed successfully.
Step 4: The beacon starts the first UWB ranging to the base station 1, checks the networking phase period time of the beacon, and communicates the calculate distance d1.
Step 5: Based on the order of the ID number of the master base station, the beacon sends bilateral bidirectional ranging signals to the slave base stations 2, 3 and 4 respectively.
Step 6: The base stations 2,3,4 respond to the UWB ranging signals in sequence, and the beacon receives and calculates the distances d2, d3, d4 through time
Step 7: The distances d1, d2, d3, and d4 are sent to the base station 1 through UWB communication, and the coordinate of the beacon is calculated by the base station 1, thus completing a positioning calculation.

FIG. 5

NETWORKING AND POSITIONING METHOD, SYSTEM AND DEVICE, AND STORAGE MEDIUM

CROSS-REFERENCE TO RELATED APPLICATIONS

This application is a U.S. National Phase application under 35 U.S.C. § 371 of International Patent Application No. PCT/CN2020/108538, filed on Aug. 11, 2020, which claims priority to Chinese patent application No. 201911002150.5 filed on Oct. 21, 2019, the entire contents of which are incorporated herein by reference.

TECHNICAL FIELD

The present disclosure relates to the technical field of wireless communication, in particular to a method, system, a device and a storage medium for networking and positioning.

BACKGROUND

Due to the characteristics of ultra-wideband (UWB) signal frequency band and channel, there are serious interference and signal conflicts between the signals transmitted by two UWB devices, so one of the UWB devices is unable to simultaneously receive the signals transmitted by the other two of the UWB devices, which will lead to serious errors in the reception of UWB receiver, and may even cause damage to the receiver with data reception failures. In the case of multi-base stations, it is necessary to allocate the phase time at which the ranging starts for each UWB beacon, schedule and regulate the periodic ranging phase time for each beacon, so as to avoid the conflicts of two or more signals of UWB device at the same ranging and positioning time, otherwise interference of ranging and positioning data and failures of ranging and positioning would occur. Under the circumstance of large-scale multi-beacon parallel positioning in a large area, a positioning beacon carries out periodic phase synchronization of positioning and networking, and acquires the ID number of the nearest master base station. Positioning method of time-of-flight (TOF) ranging (UWB bi-directional positioning and ranging method) is used in existing UWB positioning, in which base station positioning in each region block is supported merely on the premise of positioning efficiency. That is, the base stations can only be deployed based on region blocks, and large-scale and seamless connections of UWB base stations are not supported. The reason is that beacons have to acquire an ID of the nearest base station for each positioning, and this would occupy a large part of the time for UWB communication and ranging, and would reduce UWB positioning and ranging efficiency and reduce the number of beacons available for positioning.

SUMMARY

There are provided a method, a system, a device, and a storage medium for networking and positioning in at least some embodiments of the present disclosure, to at least alleviate the above-mentioned technical problems.

In an alternative embodiment of the present disclosure, there is provided a method for networking and positioning, which is performed by a positioning beacon, the method includes, acquiring, through Bluetooth communication, Bluetooth broadcast positioning data broadcast by a positioning master base station in a preset positioning region, in which the Bluetooth broadcast positioning data is used for networking and positioning of the positioning beacon, and each of the positioning beacon and the positioning master base station is provided with a Bluetooth communication device, respectively; and performing networking and positioning of the positioning beacon based on the Bluetooth broadcast positioning data.

In some alternative embodiments, before acquiring a Bluetooth broadcast positioning data broadcast by a positioning master base station in a preset positioning region through Bluetooth communication, the method includes, scanning for and acquiring broadcast signal respectively of a plurality of master base stations in a preset range through Bluetooth communication, in which the broadcast signal includes Bluetooth broadcast positioning data respectively of each of the plurality of master base stations; determining a positioning master base station from the plurality of main base stations, and determining a coverage region of the positioning master base station as the preset positioning region, in which the positioning master base station is one of the plurality of master base stations which has the strongest RSSI of the broadcast signal.

In some alternative embodiments, the Bluetooth broadcast positioning data includes an ID of the positioning master base station and an available positioning phase time interval; and the phase time interval for positioning communication between the positioning beacon and the positioning master base station includes a plurality of the positioning phase time intervals, and at least two slave base stations are included in the preset positioning region; and performing a networking and a positioning for the positioning beacon based on the Bluetooth broadcast positioning data, includes, calculating an estimated phase period for networking based on the ID of the positioning master base station, transmitting a request for networking to the positioning master base station during the estimated phase period for networking, such that a networking is performed within the available positioning phase time interval, and measuring and calculating a distance between the positioning beacon and the positioning master base station such that the positioning beacon is positioned in the preset positioning region.

In some alternative embodiments, performing the networking within the available positioning phase time interval includes, acquiring the recorded duration of information transmission and reception as the positioning beacon interacts with the positioning master base station, and performing the networking within the available positioning phase time interval by a preset networking algorithm.

In some alternative embodiments, the preset networking algorithm includes the time-of-flight (TOF) positioning and ranging method.

In some alternative embodiments, the ID of the positioning master base station and the ID of each slave base station are unique and are not identical with each other, and measuring and calculating a distance between the positioning beacon and the positioning master base station such that the positioning beacon is positioned in the preset positioning region, includes, sequentially transmitting a ranging request signal to the positioning master base station and a respective one of the at least two slave base stations based on the ID of the positioning master base station and the ID of each slave base station respectively; acquiring a first distance between the positioning beacon and the positioning master base station based on a feedback signal responding to the ranging request signal from the positioning master base station, and a second distance between the positioning beacon and a respective one of the at least two slave base stations based on a feedback signal responding to the ranging request signal from the respective one of the at least two slave base stations, and transmitting the first distance and the second distance to the positioning master base station, so that the positioning master base station can perform a calculation with the first distance and the second distance to acquire a positioning coordinate of the positioning beacon.

In some alternative embodiments, subsequent to, acquiring a first distance between the positioning beacon and the positioning master base station based on a feedback signal responding to the ranging request signal from the positioning master base station, the method further includes, performing a determination as to whether the first distance is greater than a preset threshold, in response to a determination that the first distance is greater than a preset threshold, determining that the positioning beacon is out of the preset region and releasing the available positioning phase time interval; and in response to a determination that the first distance is no more than the preset threshold, transmitting the first distance and the second distance to the master base station to acquire a positioning coordinate of the positioning beacon.

In an alternative embodiment of the disclosure, there is further provided a system for networking and positioning, the system includes, an acquisition module, which is configured to acquire Bluetooth broadcast positioning data broadcast by a positioning master base station in a preset positioning region through Bluetooth communication, in which the Bluetooth broadcast positioning data is used for networking and positioning of the positioning beacon, and each of the positioning beacon and the positioning master base station is provided with a Bluetooth communication device, respectively; and a networking and positioning module, which is configured to perform networking and positioning of the positioning beacon based on the Bluetooth broadcast positioning data.

In an alternative embodiment of the disclosure, there is further provided an electronic device, which includes a processor and a memory configured to store computer instructions, which when executed by the processor, causes the processor to carry out the method for networking and positioning as described above.

In an alternative embodiment of the disclosure, there is further provided a computer-readable storage medium storing one or more programs executable by a processor, which when executed by the processor, causes the processor to carry out the method for networking and positioning as described above.

At least some embodiments of the present disclosure have the following beneficial effects. The positioning beacon can acquire the Bluetooth broadcast positioning data broadcast by the positioning master base station in the preset positioning region through Bluetooth communication. The positioning master base station can also broadcast the Bluetooth broadcast positioning data, which is used for networking and positioning of the positioning beacon. The UWB communication can be modulated through Bluetooth communication to realize parallel positioning between a large scale of base stations and a plurality of positioning beacons. Further, the optimal positioning region and the networking phase period for positioning of each positioning beacon can be acquired through Bluetooth communication on the positioning master base station. And thus, rapid networking and positioning are achieved, to realize quick networking and positioning, and thereby avoiding the occupation of the communication time of UWB positioning due to the acquisition of data using UWB communication. Also achieved are quick automatic networking of the positioning beacon, automatic acquisition of a positioning period rule of the positioning beacon, an increase of the positioning speed, an increase of the number of beacons available for positioning. Therefore, the problem of local restrictions of a base station is solved.

BRIEF DESCRIPTION OF DRAWINGS

FIG. 2($b$) depicts a schematic diagram of a circuit of a slave base station according to one embodiment of the present disclosure.

FIG. 2($c$) depicts a schematic diagram of a circuit of a positioning master base station according to one embodiment of the present disclosure.

FIG. 3 depicts a schematic diagram of content of Bluetooth broadcast positioning data according to one embodiment of the present disclosure.

FIG. 4 depicts a schematic diagram of the location of deployment relationship of the master and slave positioning base stations according to one embodiment of the present disclosure.

FIG. 5 depicts a schematic diagram of positioning and networking by a positioning beacon according to one embodiment of the present disclosure.

DETAILED DESCRIPTION

It should be understood that the specific embodiments described herein are intended to illustrate the present disclosure merely, and are not intended to limit the present disclosure.

In the following description, the use of suffixes such as "module", "component" or "unit" to represent elements is only for the convenience of the description of the present disclosure, and they do not necessarily have a specific meaning. Therefore, "modules", "components" or "units" can be used in combination.

In order to illustrate the embodiments of this disclosure, the implementation of this disclosure will be described with details through several specific examples.

Figure 1:
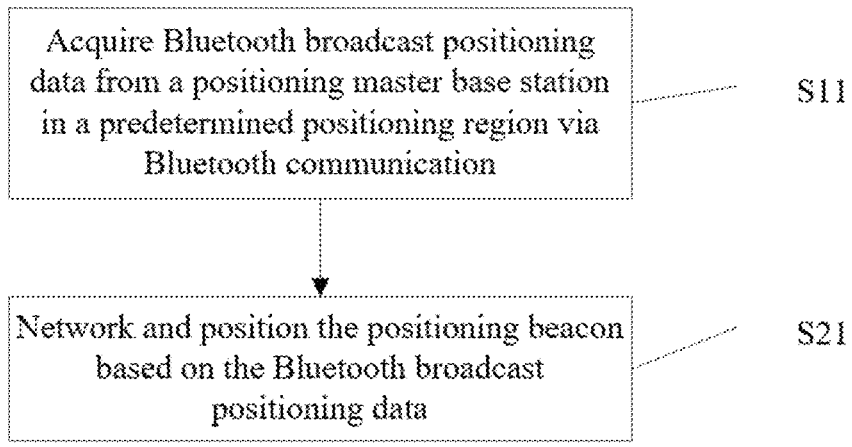
FIG. 1 depicts a flowchart of a method for networking and positioning according to one embodiment of the present disclosure.

FIG. 1 depicts a flowchart of a method for networking and positioning according to an embodiment of this disclosure. As shown in FIG. 1, the method can be performed by a positioning beacon, and includes the following steps.

In S11, Bluetooth broadcast positioning data from a positioning master base station in a preset positioning region, is acquired via Bluetooth communication.

In this embodiment, each of the positioning master base station and the positioning beacon is additionally provided with a Bluetooth communication circuit. Alternatively, in another embodiment, each of the positioning beacon and the positioning master base station may be provided with a Bluetooth communication device.

In this embodiment, one or more positioning beacons are provided. That is, these positioning beacons respectively acquire the Bluetooth broadcast positioning data from a positioning master base station in a respective one of preset positioning regions.

In S21, the positioning beacon is networked and positioned based on the Bluetooth broadcast positioning data.

The algorithm for networking and positioning here may include but is not limited to, time-of-flight (TOF) positioning and ranging method (UWB bidirectional positioning and ranging method). However, it is not intended to limit to a particular algorithm, in this embodiment.

Therefore, the positioning master base station can broadcast the Bluetooth broadcast positioning data, and the positioning beacon can acquire the Bluetooth broadcast positioning data as broadcast by the positioning master base station in the preset positioning area via Bluetooth communication. Specifically, the Bluetooth broadcast positioning data is intended for networking and positioning of the positioning beacon. Thereby not only the parallel positioning of a base station and a plurality of positioning beacons in a large area can be realized by modulating UWB communication through Bluetooth communication, but also the optimal positioning region and the positioning networking phase period of each positioning beacon can be obtained via Bluetooth communication of the positioning master base station. Rapid networking and positioning are achieved. As such the occupation of the communication time of UWB positioning due to the acquisition of data using UWB communication is avoided. Also achieved are quick automatic networking of the positioning beacon, automatic acquisition of a positioning period rule of the positioning beacon, an increase of the positioning speed, an increase of the number of beacons available for positioning. Therefore, the problem of local restrictions of a base station is solved.

In addition, the method further includes the following steps, before the S11 as described above.

In S101, a broadcast signal from each of a plurality of master base stations in a preset range is scanned for and acquired via Bluetooth communication, in which the broadcast signal includes Bluetooth broadcast positioning data respectively of each of the plurality of master base stations.

In S102, a positioning master base station is determined from the plurality of master base stations, and the coverage region of the positioning master base station is determined as the preset positioning region, in which the positioning master base station is one of the plurality of master base stations which has the strongest RSSI of the broadcast signal.

In this embodiment, the Bluetooth device of the positioning beacon operates in Bluetooth scanning mode. Assuming that the Bluetooth scanning duration is half a positioning period Ts, and the duration for the positioning beacon to refresh the positioning is Ts. And no Bluetooth signal detected from the positioning master base station during one scanning period indicates that there is no positioning master base station around the positioning beacon, the positioning beacon will stop scanning and switch to a low power consumption state. The positioning beacon will start another periodic scanning after a preset interval. If a Bluetooth broadcast signal of any master base station is detected, the positioning beacon, after a scanning period Ts, sorts all the detected broadcast signals by their RSSI, chooses the broadcast signal having the strongest signal strength of positioning master base, identifies the master base with the strongest signal strength as the positioning master base, and identifies the region covered by the positioning master base station as the preset positioning region of the positioning beacon. This is because a stronger RSSI signal strength received by the positioning beacon, indicates that the positioning beacon is positioned closer to the master positioning base station, the positioning accuracy of the positioning beacon is higher with a closer base station and the positioning stability is better.

In addition, in another embodiment, the Bluetooth broadcast positioning data includes an ID of the positioning master base station and an available positioning phase time interval. Furthermore, the phase time interval for positioning communication between the positioning beacon and the positioning master base station includes a plurality of the positioning phase time intervals, and at least two slave base stations are included in the preset positioning region.

In this case, in one implementation, S21 as described above includes the following.

In S211, an estimated phase period for networking is calculated based on the ID of the positioning master base station.

In this embodiment, after acquiring the ID of the positioning master base station, the positioning beacon then calculates the time for networking with the positioning master base station, so it is necessary to first calculate the estimated phase period for networking.

In S212, a request for networking is transmitted to the positioning master base station during the estimated phase period for networking, such that networking is performed within the available positioning phase time interval.

Therefore, the positioning beacon transmits a request for networking to the positioning master base station when the preset networking phase period is reached, so as to perform networking within the available positioning phase time interval.

In S213, a distance between the positioning beacon and the positioning master base station is measured and calculated such that the positioning beacon is positioned in the preset positioning region.

In this embodiment, after the networking is performed, the positioning beacon may measure and calculate its distance with respect to the positioning master base station and the distance with respect to the slave base station, such that the positioning beacon is positioned based on the result of the measurement and calculation.

In addition, in another embodiment, the networking within the available positioning phase time interval is particularly performed by, acquiring the recorded duration of information transmission and reception as the positioning beacon interacts with the positioning master base station, and performing the networking within the available positioning phase time interval by a preset networking algorithm.

Figure 7:
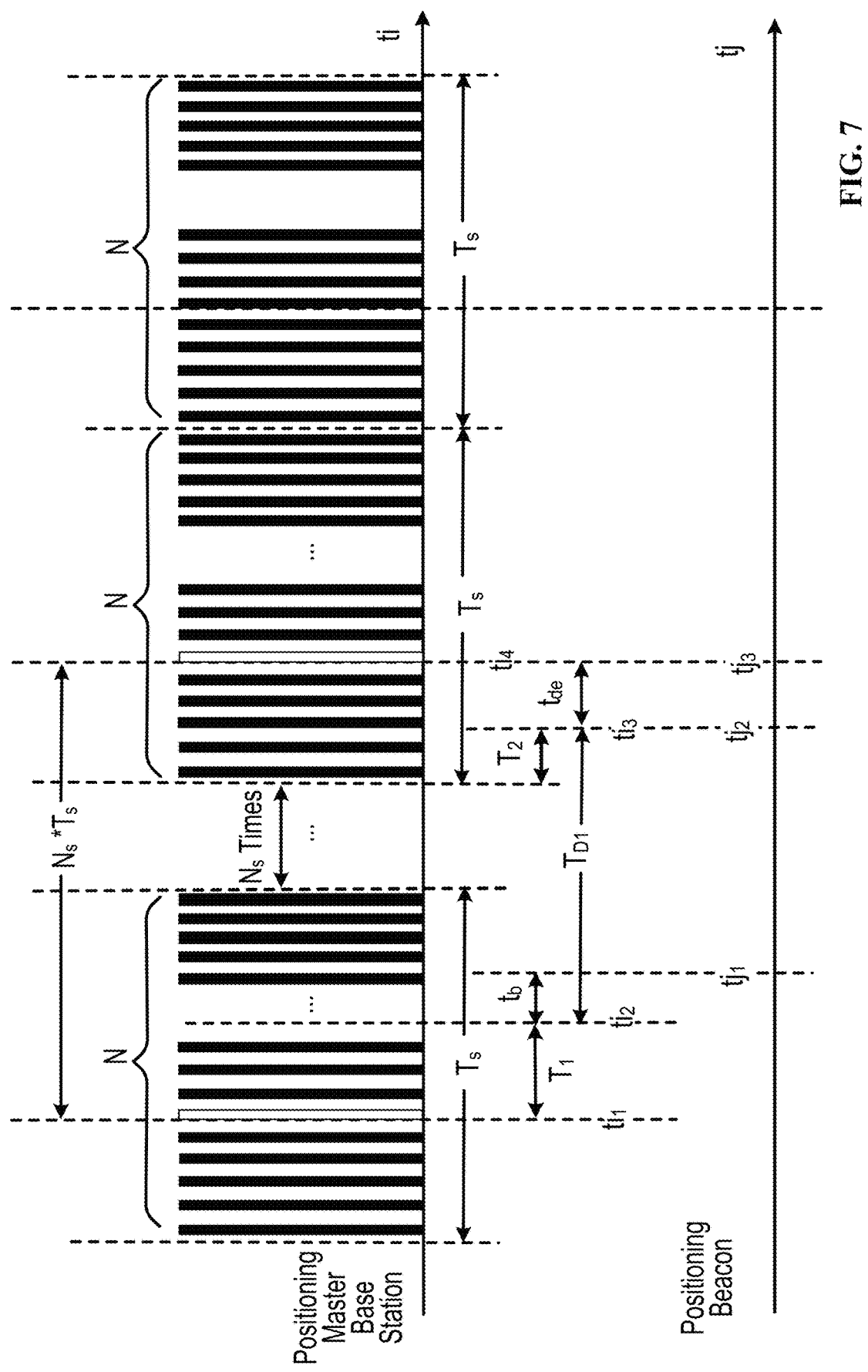
FIG. 7 depicts a schematic diagram of a phase period of a positioning beacon networking according to one embodiment of the present disclosure.

FIG. 7 is a schematic diagram of networking phase period for positioning beacons according to one embodiment of the present disclosure. As shown in FIG. 7, Ti represents the time axis of the positioning master base station, Ti indicates the time axis of positioning beacon, $ti_1$ indicates the period of an available phase interval of the master base station at moment $ti_1$, indicates the moment at which the master base station broadcasts, $ti_3$ indicates the moment of the master base station corresponding to the estimated networking moment by the beacon; $ti_4$ indicates an available phase interval of the master base station at moment $ti_4$; $t_b$ indicates the duration of a Bluetooth broadcasting process; $tj_1$ indicates that the beacon detects the broadcast data at moment $tj_1$; $tj_2$ indicates that the beacon stops scanning for the broadcast data at moment $tj_2$; $tj_3$ indicates the estimated moment for networking by the beacon; $t_{de}$ indicates the delay necessary for the estimated moment for networking by the beacon; $T_s$ indicates a positioning period; N indicates there are N available phase intervals in a positioning period that can be used for networking, and indicates N positioning beacons. Therefore, in this embodiment, as shown in FIG. 7 which depicts a periodic diagram of the phase interval and time slot during networking through acquiring Bluetooth broadcast data and ID number of the positioning master base station by Bluetooth scanning of the positioning beacon.

It is a key factor to divide the phase time interval of positioning communication between each positioning beacon and the positioning master base station into a plurality of positioning phase time intervals, to achieve multi-beacon positioning. As shown in FIG. 7, a small black rectangular bar represents an occupied positioning phase time interval, and there are N positioning phase time intervals in one positioning period Ts, which indicates that the positioning master base station in the preset positioning region can support the positioning of N UWB beacons. And an available positioning phase time interval which is to be used for networking is represented by a small white rectangular bar (i.e., the above-mentioned available positioning phase time interval). In order to solve the problem of beacon networking, the Bluetooth broadcast interval of the positioning master base station shall be less than the positioning period Ts. The Bluetooth broadcast interval of the positioning master base station is set to be Ts/2 herein. The controller system time of the positioning master base station is denoted as ti. The phase time interval for the Bluetooth broadcast data of the positioning master base station is denoted as $ti_2$, for instance. And the positioning phase time interval corresponding to the nearest available positioning phase time interval before $ti_2$ is denoted as $ti_1$. Because the Bluetooth broadcast data packets of the positioning master base station are transmitted during a period of time, the Bluetooth broadcast duration is denoted as $t_b$. The moment at which the broadcast signal is detected through Bluetooth by the positioning beacon is denoted as $tj_1$. A scanning period is terminated at moment $tj_2$, at which the scanning is terminated, and the broadcast data is parsed. Parsing of the broadcast data results in acquiring the ID number of the master base station, a time interval $ti_2$ of the system timer in the master base station during which the master base station broadcasts, and an available phase time interval $ti_1$. Both $ti_1$ and $ti_2$ are based on timing of the master base station, and $tj_1$ and $tj_2$ are based on timing of the positioning beacon, which are independent from each other. It is necessary to associate them with each other in time domain here. Specifically, the positioning beacon scans and receives data at $tj_2$. Assuming that the positioning beacon calculates and estimates to start networking at moment $tj_3$, that is, the positioning beacon needs to wait and delay for a duration $t_{de}$ before starting networking, so as to avoid conflict of signals between the positioning beacon and other beacons in the networking process. As such, the phase difference $TD_1$ at moment $tj_2$ with respect to the time at which the broadcast starts is, $$TD_1=ti_2-tj_1+t_b.$$

The phase difference $T_1$ between the networking phase time of the positioning beacon and the broadcast time is:

$$T_1=ti_2-ti_1.$$

The time $ti_3$ of the master base station system time with respect to the moment the $tj_2$ of positioning beacon is:

$$ti_3=T_1+TD_1.$$

It is estimated that the beacon can catch up with the networking phase time after cycles of integer $N_s$ at the earliest, and $$N_s=\text{abs}(ti_3/T_s).$$

Then the phase delay time $T_2$ at moment $ti_3$ is:

$$T_2=((ti_3/T_s)-N_s)/T_s$$

As a result, the delay duration $t_{de}$ is:

$$t_{de}=N_s*T_s-T_2.$$

Figure 6:
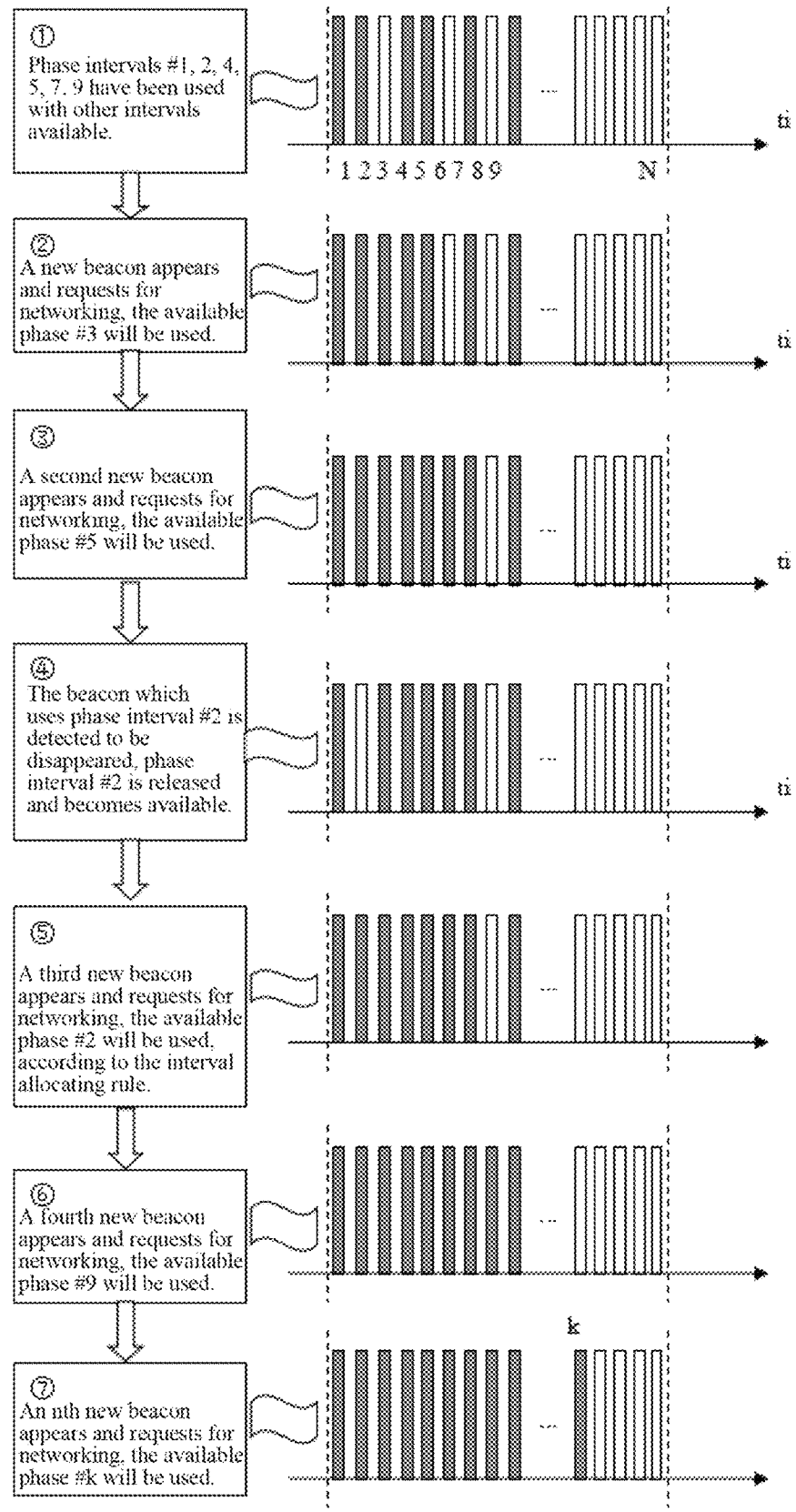
FIG. 6 depicts a schematic diagram of the logical relationship of networking with an available phase and releasing of a phase according to one embodiment of the present disclosure.

The beacon deactivates the Bluetooth communication and activates the UWB communication at moment ti4, and transmits a networking request to the master base station. The beacon calculates the next available positioning phase time interval of the master base station and calculates the estimated delay duration $t_{de}$ at moment $ti_2$. The positioning beacon, after delaying for $t_{de}$, starts to transmit a networking request to the positioning master base station at moment $tj_3$. The above procedure shows how the beacon acquires the available positioning phase time interval. The available positioning phase time interval is not in the next period. If the scanning stops at a time later than the available phase time, the available positioning phase time interval is in the next period. Therefore, the networking of the master base station is performed in the order from low to high in the number of the available networking phase interval. As shown in FIG. 6, this method shows sequential and logiccal process of beacon networking using a time interval and releasing a phase interval.

It should be noted that it is unnecessary for a slave base station to additionally have a Bluetooth circuit, since the slave base station acts passively and mainly performs UWB bilateral bidirectional ranging under the active positioning request from the positioning beacon.

Furthermore, the ID of the positioning master base station and the ID of each slave base station are unique and are not identical with each other. An implementation of S213 described above includes, sequentially transmitting a ranging request signal to the positioning master base station and a respective one of the at least two slave base stations based on the ID of the positioning master base station and the ID of each slave base station respectively; acquiring a first distance between the positioning beacon and the positioning master base station based on a feedback signal responding to the ranging request signal from the positioning master base station, and a second distance between the positioning beacon and a respective one of the at least two slave base stations based on a feedback signal responding to the ranging request signal from the respective one of the at least two slave base stations, and transmitting the first distance and the second distance to the positioning master base station, so that the positioning master base station can perform a calculation with the first distance and the second distance to obtain the positioning coordinates of the positioning beacon.

In some alternative embodiments, the method further includes, performing a determination as to whether the first distance is greater than a preset threshold, in response to a determination that the first distance is greater than a preset threshold, determining that the positioning beacon is out of the preset region and releasing the available positioning phase time interval; and in response to a determination that the first distance is no more than the preset threshold, transmitting the first distance and the second distance to the master base station to acquire a positioning coordinate of the positioning beacon.

FIG. 4 is a schematic diagram of the distribution relationship of the deployment positions of master and slave positioning base stations according to one embodiment of this disclosure. As shown in FIG. 4, the base stations are deployed according to a preset positioning region block rule, in which each positioning region block includes one positioning master base station and at least two positioning slave base stations.

Furthermore, each of the positioning master and slave base stations is sequentially numbered with an ID number in advance, and all base stations are divided per each preset positioning region, that is, there is only one positioning master base station and at least two slave base stations in each positioning region. The positioning master and slave base stations are numbered in a rule such that, the ID number of each slave base station is automatically and sequentially incremented by one on the basis of the ID number of the master base station, so that the ID numbers of the master-slave base stations in each positioning area are continuous, and the ID number of each positioning base station is unique and is not identical with each other.

Because the ID numbers of the master base station and the slave base stations in a small positioning region are in ascending order, and the ID number of each base station is unique, once the positioning beacon acquires the ID number of the positioning master base station in the above steps, the phase period is corrected at the same time. Since the ID numbers of the master base station and the slave base stations are in ascending order, the ID numbers of the slave base stations and the number of base stations can be known once the ID number of the master base station is acquired, such that the ranging request can be transmitted to the slave base stations. Each ranging is performed based on the master base station. The positioning beacon will continue to periodically range and positioning according to the ID number of the master base station once the beacon does not update the ID number of the positioning master base station. Therefore, in order to increase the number of beacons for positioning, the most communication ranging short-time method is used, that is, the bilateral bidirectional ranging method. Ranging is performed with the order of master base station ID, slave base station ID+1, slave base station ID+2 and slave base station ID+3 one by one. The data of distance is stored at the beacon after each ranging is performed, and is transmitted to the master base station through UWB after a round of ranging is finished by the beacon. The data is calculated by the master base station for the position of the beacon that is transmitted to a remote server through a network.

In some alternative embodiments, UWB communication is modulated by Bluetooth communication to realize parallel positioning of base stations and beacons in a large region. Bluetooth communication circuits are integrated into the master base station and beacon respectively. And the time of each positioning period is divided into positioning phase time intervals for positioning and ranging of the beacons. And Bluetooth communication is used instead of UWB for additional communication other than positioning signals. That is, a positioning beacon transmits a positioning signal through UWB, and the rest of the communication is performed via Bluetooth communication. The additional communication mainly relates to the acquisition of the ID number of the nearest master base station in the optimal positioning region and the positioning phase time interval for networking and positioning of the beacons. As such each UWB beacon is automatically allocated with a phase time interval, thus realizing fast and automatic networking. Thereby the number of beacons available for positioning is increased, and the limitation on the use of base stations in a large region is eliminated.

In some alternative embodiments, the network topology relationship between UWB positioning master base station and UWB positioning slave base station is adopted, the network topology and schematic diagram of base stations deployment are shown in FIG. 3. each of the positioning master and slave base stations is sequentially numbered with an ID number, and all base stations are divided per each positioning region, that is, there is only one positioning master base station and 2 to 5 slave base stations in one positioning region. The positioning master and slave base stations are numbered in a rule such that, the ID number of each slave base station is automatically and sequentially incremented by one on the basis of the ID number of the master base station, so that the ID numbers of the master-slave base stations in each positioning area are continuous, and the ID number of each base station is unique and is not identical with each other.

The main functions of the master base station with an additional Bluetooth circuit integrated are as follows.
1. Periodically broadcasting parameters of the master base station, feeding back and responding to the command parameters broadcast by the positioning beacon, and broadcasting the beacon networking parameter information and the available positioning phase time intervals in the idle state, via Bluetooth.
2. Carrying out a UWB bilateral bidirectional ranging under an active positioning request from a UWB beacon (the above-mentioned positioning beacon).
3. Calculating a coordinate of the positioning beacon in the positioning region, and uploading distance data or positioning data in a centralized manner.

It should be noted that it is unnecessary for a slave base station to additionally have a Bluetooth circuit, since the slave base station acts passively and mainly performs UWB bilateral bidirectional ranging under the active positioning request from the UWB beacon.

The main functions of a positioning beacon with an additional Bluetooth circuit integrated are described as follows.
1. Scanning and detecting the optimal positioning region via Bluetooth and acquiring the broadcast information from each master base station around.
2. Performing networking and positioning with the phase period in the region according to the broadcast parameter and data.
3. Calculating an estimated networking phase period, and actively initiating a positioning request during the estimated networking phase period for ranging and positioning with the master and slave base stations.

Figure 2A:
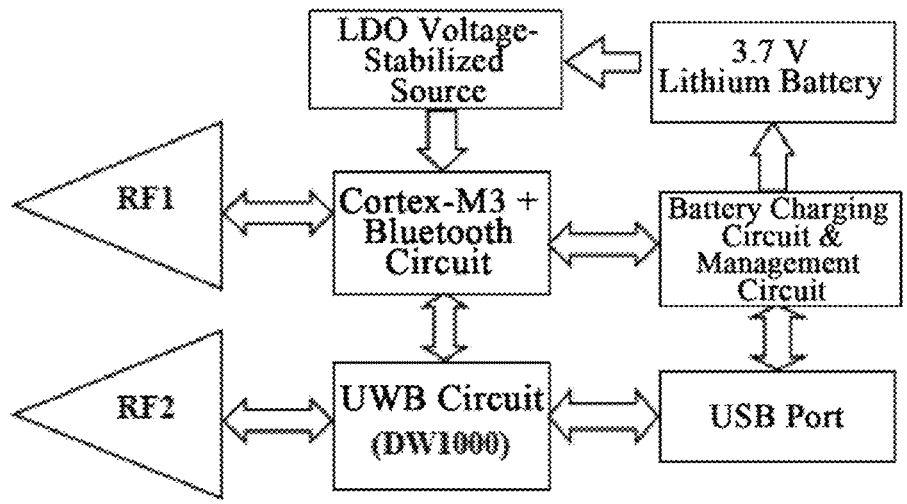
FIG. 2($a$) depicts a schematic diagram of a circuit of a positioning beacon according to one embodiment of the present disclosure.
Figure 2B:
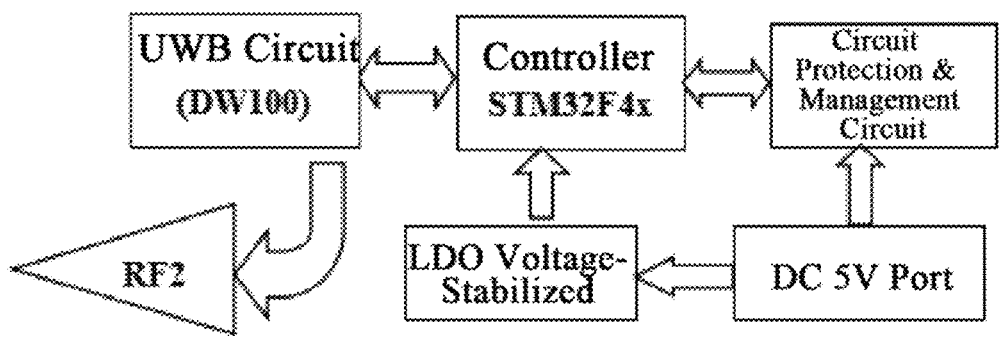

In some alternative embodiments, as shown in FIG. 2(a), FIG. 2(b) and FIG. 2(c), a Bluetooth communication circuit is integrated into the master base station and beacon respectively. The positioning master base station includes a main controller (STM32F4), a UWB transceiver circuit (DW1000), a UWB antenna, a Bluetooth chip circuit (CC2640R2F) and a Bluetooth inverted-F antenna, a W5500 Ethernet and POE network port, a Wi-Fi circuit, a 12V-DC5.5/2.5 connector and a power manager. The positioning beacon includes a Coter-M3+ Bluetooth transceiver circuit (CC2640R2F) with low power consumption, a UWB transceiver (DW1000) and a UWB antenna, a Bluetooth circuit, a Bluetooth antenna, a 3.7V lithium battery, and a power supply charging management circuit module (Description of positioning beacon circuit, CC2640R2F is a chip integrated with the Coter-M3+ Bluetooth transceiver circuit with a low power consumption main processor, such that, a separate controller circuit is eliminated, thus lowering the power consumption of the beacon greatly. The positioning slave base station includes a main controller (STM32F4), a UWB transceiver circuit (DW1000), a UWB antenna, as well as a 12V-DC5.5/2.5 connector, and a power manager. As shown in FIG. 2(a), FIG. 2(b) and FIG. 2(c), RF1 is a Bluetooth inverted-F transceiver antenna (built-in). RF2 is a UWB positioning transceiver antenna (built-in). RF3 is a wireless Wi-Fi transceiver antenna (external). Cortex-M3+ Bluetooth circuit employs a CC2640R2F chip from TI corporation, with a Bluetooth circuit and a main controller integrated.

In addition, in this embodiment, the advantages of the additional Bluetooth circuit are as follows. (1) A Bluetooth device is a low power consumption communication device, and the power consumption during scanning or broadcasting can be reduced to a μA level. And (2) The Bluetooth device on a beacon can scan data information broadcast by a plurality of positioning master base stations within the receiving range, which facilitates seeking the optimal positioning region. Therefore, the main purpose of the additional Bluetooth communication are as follows. (1) The positioning beacon acquires the optimal positioning region by scanning, and to acquire the optimal positioning region is actually to acquire the ID information of the positioning master base station that is closest in position to the beacon, due to the fact that, the closer the positioning beacon is positioned to the master positioning base station, the stronger the RSSI signal strength scanned by the positioning beacon, the higher the positioning accuracy, and the better the positioning stability. (2) The positioning beacon acquires networking parameter information from the information broadcast by the positioning master base station, and the positioning master base station will update the available positioning phase period time interval in real-time. And (3) The time occupied by UWB communication for ranging and positioning is reduced which otherwise would be occupied when a beacon uses UWB to acquire the optimal positioning region.

In practical applications, each positioning beacon moves from place to place, and can move from one positioning region to another, so the networking of beacons to each positioning area is a dynamic process. The communication of ranging and positioning in each positioning region is changing and updating in case that a positioning beacon enters or leaves the positioning region (a positioning region refers to the minimum base station region that enables positioning of a positioning beacon). In view of this, the key point of this method is that the time for each positioning beacon to be positioned by the base station is regarded as a communication positioning phase time interval α, and there are at most N=Ts/α communication positioning phase time intervals in one positioning period Ts, which indicates that simultaneous positioning of N positioning beacons can be realized in this region in parallel. Positioning of each beacon is a dynamic process, the positioning phase time interval for a positioning beacon in a positioning region will not change as the positioning beacon moves in the positioning region. As a positioning beacon moves to an adjacent positioning region, the master base station in the current positioning region will release the positioning phase time interval such that time interval will be available for a new positioning beacon that appears in the current region for networking, thus maximizing the positioning efficiency. The time of positioning phase time interval is managed by a timer of a master base station in the region, and which is carried out by a master controller STM32F4 of the master base station.

Moreover, the networking and positioning process when a positioning beacon enters a positioning region is described as follows.

In step 1, a positioning beacon scans for broadcast data of a master base station around and acquires the broadcast data and parameters from the nearest master base station.

In step 2, the positioning beacon calculates the latest available phase time and the estimated time for networking.

In step 3, the positioning beacon initiates a request for networking and the first ranging to the positioning base station, and the master base station determines to perform networking.

In step 4, the positioning master base station feeds back a signal for determination of the networking, and the positioning beacon corrects the positioning phase time interval again, with reference to the time of the master base station, and the time error for networking of the beacon is corrected again.

In step 5, the positioning beacon respectively performs ranging with the master and slave base stations in the positioning region in sequence according to the numbering rule of the ID numbers, and the positioning master base station monitors whether the positioning beacon leaves the region.

In step 6, the positioning beacon completes a round of ranging, and transmits the distance data to the positioning master base station for a positioning calculation, a positioning process is completed, the process will return to the previous step in the next ranging cycle, and process will return to step 4 for time correction after the 10th positioning completes.

The steps of the positioning process represent the process and logic of the positioning beacon from networking information acquisition to the success of networking, and to positioning calculation. As shown in FIG. 5 which depicts a specific networking and positioning process, the methods and steps are described with details as follows.

1. The system timer of the positioning master base station will always be on during networking. The positioning master base station will periodically broadcast the positioning data via Bluetooth. The timer mainly serves to allocate the reference time of networking phase period to the positioning beacons in the region. The controller drives the Bluetooth chip circuit to broadcast the ID number of the positioning master base station, the time ti of the broadcast time of the base station system timer, and the available time of the positioning phase time interval every $T_s/2$ period. The broadcast contents are shown in FIG. 3. A beacon will scan data once via Bluetooth during a period $T_s$. Time ti is based on timing of the positioning master base station, and time tj is based on timing of the beacon, which are independent from each other.

2. The positioning beacon acquires and parses the Bluetooth broadcast data of the nearest positioning base station, which data includes the ID number of the master base station and the period phase time for networking. Firstly, the low power consumption main controller of the positioning beacon drives the Bluetooth chip to select an operating mode, and sets the operation mode of Bluetooth of the beacon to the Bluetooth scanning mode. The duration for Bluetooth scanning is half a positioning period $T_s$, and the time for the beacon to refresh the positioning rate is $T_s$. And no Bluetooth signal detected from the positioning master base station during one scanning period indicates that there is no positioning master base station around the positioning beacon, the positioning beacon will stop scanning and switch to a low power consumption state. The beacon starts another periodic scanning after 10 s. If a Bluetooth broadcast signal of any master base station is detected, the main controller of the positioning beacon, after a scanning period $T_s$, sorts all the detected broadcast signals by their RSSI, chooses the parameters and data from the master base station having the strongest signal strength. The coverage region of this master base station serves as a small region of a beacon for positioning, and the ID number of this master base station serves as a reference for ranging and positioning. The principle lies in that, the stronger is the RSSI signal strength received by the positioning beacon, the closer the positioning beacon is positioned to the master positioning base station, the higher the positioning accuracy, and the better the positioning stability.

3. The positioning beacon calculates an estimated phase period for networking, while the master base station scans the networking request of the beacon through Bluetooth, and the UWB function is deactivated.

As shown in FIG. 7, which depicts a period phase diagram from before networking to after positioning of the positioning beacon and the positioning master base station, which specifically refers to a period phase diagram in which the positioning beacon acquires phase (networking period phase time?) and positioning ID number of the Bluetooth broadcast data from the base station via Bluetooth. It is a key factor to divide the phase time interval of positioning communication between each positioning beacon and the positioning master base station into a plurality of positioning phase time intervals, to achieve multi-beacon positioning. As shown in FIG. 7, a small black rectangular bar represents an occupied positioning phase time interval, and there are N positioning phase time intervals in one positioning period Ts, which indicates that the positioning master base station in the preset positioning region can support the positioning of N UWB beacons. And an available positioning phase time interval which is to be used for networking is represented by a small white rectangular bar (i.e., the above-mentioned available positioning phase time interval). In order to solve the problem of beacon networking, the Bluetooth broadcast interval of the positioning master base station shall be less than the positioning period Ts. The Bluetooth broadcast interval of the positioning master base station is set to be Ts/2 herein. The controller system time of the positioning master base station is denoted as ti. The phase time interval for the Bluetooth broadcast data of the positioning master base station is denoted as $ti_2$, for instance. And the positioning phase time interval corresponding to the nearest available positioning phase time interval before $ti_2$ is denoted as $ti_1$. Because the Bluetooth broadcast data packets of the positioning master base station are transmitted during a period of time, the Bluetooth broadcast duration is denoted as $t_b$. The moment at which the broadcast signal is detected through Bluetooth by the positioning beacon is denoted as $tj_1$. A scanning period is terminated at moment $tj_2$, at which the scanning is terminated, and the broadcast data is parsed. Parsing of the broadcast data results in acquiring the ID number of the master base station, a time interval $ti_2$ of the system timer in the master base station during which the master base station broadcasts, and an available phase time interval $ti_1$. Both $ti_1$ and $ti_2$ are based on the timing of the master base station, and $tj_1$ and $tj_2$ are based on the timing of the positioning beacon, which are independent from each other. It is necessary to associate them with each other in the time domain here. Specifically, the positioning beacon scans and receives data at $tj_2$. Assuming that the positioning beacon calculates and estimates to start networking at moment $tj_3$, that is, the positioning beacon needs to wait and delay for a duration $t_{de}$ before starting networking, so as to avoid conflict of signals between the positioning beacon and other beacons in the networking process. As such, the phase difference $TD_1$ at moment $tj_2$ with respect to the time at which the broadcast starts is, $$TD_1 = tj_2 - tj_1 + t_b.$$

The phase difference $T_1$ between the networking phase time of the positioning beacon and the broadcast time is:

$$T_1 = ti_2 - ti_1.$$

The time $ti_3$ of the master base station system time with respect to the moment the $tj_2$ of positioning beacon is:

$$ti_3 = T_1 + TD_1.$$

It is estimated that the beacon can catch up with the networking phase time after cycles of integer $N_s$ at the earliest, and $$N_s = abs(ti_3/T_s).$$

Then the phase delay time $T_2$ at moment $ti_3$ is:

$$T_2 = ((ti_3/T_s) - N_s)/T_s$$

As a result, the delay duration $t_{de}$ is:

$$t_{de} = N_s * T_s - T_2.$$

The beacon deactivates the Bluetooth communication and activates the UWB communication at moment $ti_4$, and transmits a networking request to the master base station. The beacon calculates the next available positioning phase time interval of the master base station and calculates the estimated delay duration $t_{de}$ at moment $ti_2$. The positioning beacon, after delaying for $t_{de}$, starts to transmit a networking request to the positioning master base station at moment $tj_3$. The above procedure shows how the beacon acquires the available positioning phase time interval. The available positioning phase time interval is not in the next period. If the scanning stop at a time later than the available phase time, the available positioning phase time interval is in the next period. Therefore, the networking of the master base station is performed in the order from low to high in the number of the available networking phase interval. As shown in FIG. 6, this method shows the sequential and logical process of beacon networking using a time interval and releasing a phase interval.

4. Networking feedback determines and calibrates the positioning phase error offset, for the following purposes. (1) To avoid simultaneous networking requests from a plurality of idle beacons. (2) The phase offset between the beacon and base station for positioning can be calibrated again. Because there are several positioning beacons and there is no fixed reference, the time of the master base station serves as the standard reference time. In step 2, the ID number of the nearest positioning master base station and the phase time for networking can be determined. The positioning beacon stores and transmits networking request time $tj_3$, and the master base station receives the networking request and stores the receiving time $ti_4$. The positioning master base station, after acknowledging the networking, feeds back $ti_4$ to the beacon. As such, the beacon estimates the time of the master base station at time $ti_4$ to be:

$$ti_2+t_b+(tj_3-tj_1).$$

Therefore, the correction time $T_{drp}$ that is to be subtracted from the next networking time of the beacon is $$T_{drp}=ti_4-(ti_2+t_b+(tj_3-tj_1))$$

Then the next ranging time period becomes $(T_s-T_{drp})$ after the positioning beacon completes a calculation of a positioning period, so as to realize the calibration of the offset of the positioning phase error.

5. The networking is completed, and UWB positioning and ranging are started. As shown in FIG. 4, the base stations are deployed according to a preset positioning region block rule, in which each positioning region block includes one positioning master base station and at least two positioning slave base stations. Because the ID numbers of the master base station and the slave base stations in a small positioning region are in ascending order, and the ID number of each base station is unique, once the positioning beacon acquires the ID number of the positioning master base station in the above steps, the phase period is corrected at the same time. Since the ID numbers of the master base station and the slave base stations are in ascending order, the ID numbers of the slave base stations and the number of base stations can be known once the ID number of the master base station is acquired, such that the ranging request can be transmitted to the slave base stations. Each ranging is performed based on the master base station. The positioning beacon will continue to periodically range and positioning according to the ID number of the master base station once the beacon does not update the ID number of the positioning master base station. Therefore, in order to increase the number of beacons for positioning, the most communication ranging short-time method is used, that is, the bilateral bidirectional ranging method. Ranging is performed with the order of master base station ID, slave base station ID+1, slave base station ID+2 and slave base station ID+3 one by one. The data of distance is stored at the beacon after each ranging is performed, and is transmitted to the master base station through UWB after a round of ranging is finished by the beacon. The data is calculated by the master base station for the position of the beacon that is transmitted to a remote server through a network.

Due to frequent networking of the beacons, the data throughput of the master base station can be very large and the amount of computation can be considerable. STM32F4 is used as the processor of the master base station in this disclosure. After the slave base station answers the ranging signal every time, and when the positioning master base station detects that the positioning beacon is out of connection, the positioning phase time interval is released, and the state of the positioning phase time interval changes from occupied to available. Only when there is a new positioning beacon request next time, will a new networking process be carried out, as shown in FIG. 6.

6. Calibration of the networking period. Due to the crystal clock deviation between the beacon controller time and the positioning master base station controller time, the longer the cumulative time of positioning times, the greater the error, which will seriously lead to the mismatch of the positioning period between the positioning beacon and the positioning base station, resulting in the conflict of UWB positioning signals in the front and rear phases. In order to avoid the error of clock offset, it is necessary to periodically correct the time phase of the beacon. The solution is that the positioning beacon returns to step 3 every 10 s/period for clock correction. The corrected parameters are the data frame parameters of the positioning request replied by the positioning master base station, and the clock of the positioning beacon is corrected by subtracting the offset clock error. At the same time, the positioning master base station will regularly check whether each positioning beacon is out of connection, and clear the positioning phase time interval occupied by the positioning beacon that is out of connection to vacate some available phase time intervals for positioning for the following positioning networking of beacons.

TOF positioning method is adopted herein, in which, the optimal positioning region is searched for by Bluetooth broadcasting and scanning.

Available phase period of the master base station is calculated and estimated via Bluetooth communication before networking, which greatly reduces the number of UWB communication for non-ranging, increases the range and number of beacons for positioning, and thus the problem of multi-beacon parallel positioning in a large scale is solved in large part. By means of the positioning network topology of the master base station and slave base station for positioning, the problem of signal conflict of multi-beacon simultaneous positioning is solved. Simultaneous positioning of 1000 beacons can be realized in parallel in each 50*50 m positioning region. And parallel positioning of 1000 beacons can be realized in a plurality of the positioning regions, which can be used for large-scale positioning.

It is apparent that, TDOA wireless clock synchronization method can be used as well, which requires frequent correction of UWB clock, that is, it directly synchronizes the time of electromagnetic wave in picosecond level. UWB in picosecond level requires extremely high clock accuracy, and it is challenging for wireless clock synchronization method to achieve clock synchronization in femtosecond level. The accuracy of the commercially available TDOA positioning method can only reach 50 cm, and the installation and debugging on site are also challenging. The method introduced herein relates to a large-scale and parallel positioning method for UWB multi-beacon via Bluetooth communication, based on the TOF method. The guaranteed accuracy can reach 10 cm-20 cm, and the installation on site is less challenging, with wireless clock synchronization in picosecond level eliminated. In the method as described herein, the parameters and information of a master base station are acquired through Bluetooth communication by a Bluetooth circuit. And time for the UWB communication of the base station is saved. The clock of the controller is used for networking and phase offset correction. The time correction level is changed to µs level, which makes the control of the phase time easier.

Figure 8:
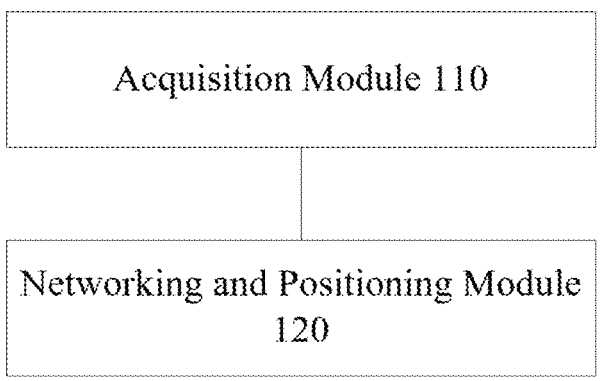
FIG. 8 depicts a schematic block diagram of components of a system for networking and positioning according to one embodiment of the present disclosure.

FIG. 8 is a schematic block diagram of components of a system for networking and positioning according to one embodiment of the present disclosure. As shown in FIG. 8, the system for networking and positioning is included in a positioning beacon, and the system includes, an acquisition module 110 which is configured to acquire Bluetooth broadcast positioning data broadcast by a positioning master base station in a preset positioning region through Bluetooth communication, in which the Bluetooth broadcast positioning data is configured for networking and positioning of the positioning beacon; and a networking and positioning module 120, which is configured to perform networking and positioning of the positioning beacon based on the Bluetooth broadcast positioning data.

In some alternative embodiments, the system further includes a scanning module, which is configured to scan for and acquire a broadcast signal from each of a plurality of master base stations in a preset range through Bluetooth communication, in which the broadcast signal includes Bluetooth broadcast positioning data respectively of each of the plurality of master base stations; and a positioning master base station determining module, which is configured to, determine a positioning master base station from the plurality of master base stations, and determine a coverage region of the positioning master base station as the preset positioning region, in which the positioning master base station is one of the plurality of master base stations which has the strongest RSSI of the broadcast signal.

In some alternative embodiments, the Bluetooth broadcast positioning data includes an ID of the positioning master base station and an available positioning phase time interval. Furthermore, the phase time interval for positioning communication between the positioning beacon and the positioning master base station includes a plurality of the positioning phase time intervals, and at least two slave base stations are included in the preset positioning region.

And the networking and positioning module 120 further includes, a networking time calculation unit configured to calculate an estimated phase period for networking based on the ID of the positioning master base station, and a networking unit configured to transmit a request for networking to the positioning master base station during the estimated phase period for networking, such that networking is performed within the available positioning phase time interval, and measure and calculate a distance between the positioning beacon and the positioning master base station such that the positioning beacon is positioned in the preset positioning region.

In some alternative embodiments, the positioning unit is further configured to acquire the recorded duration of information transmission and reception as the positioning beacon interacts with the positioning master base station, and to perform the networking within the available positioning phase time interval by a preset networking algorithm.

In some alternative embodiments, the preset networking algorithm includes the time-of-flight (TOF) positioning and ranging method.

In some alternative embodiments, the ID of the positioning master base station and the ID of each slave base station are unique and are not identical with each other. And the positioning unit is further configured to, sequentially transmit a ranging request signal to the positioning master base station and a respective one of the at least two slave base stations based on the ID of the positioning master base station and the ID of each slave base station respectively; acquire a first distance between the positioning beacon and the positioning master base station based on a feedback signal responding to the ranging request signal from the positioning master base station, and a second distance between the positioning beacon and a respective one of the at least two slave base stations based on a feedback signal responding to the ranging request signal from the respective one of the at least two slave base stations, and transmit the first distance and the second distance to the positioning master base station, so that the positioning master base station can perform a calculation with the first distance and the second distance to acquire a positioning coordinate of the positioning beacon.

In some alternative embodiments, the system further includes a decision module configured to, perform a determination as to whether the first distance is greater than a preset threshold, in response to a determination that the first distance is greater than a preset threshold, determine that the positioning beacon is out of the predetermine region and release the available positioning phase time interval; and in response to a determination that the first distance is no more than the preset threshold, transmit the first distance and the second distance to the master base station to acquire a positioning coordinate of the positioning beacon.

In an alternative embodiment of the disclosure, there is further provided an electronic device, which includes a processor and a memory configured to store computer instructions, which when executed by the processor, causes the processor to carry out the method for networking and positioning as described above.

Please refer to the method for networking and positioning in the above-mentioned embodiments of this disclosure, for terms and principles related to an electronic device in one of the optional embodiments of this disclosure, and which will not be repeatedly described here.

In an alternative embodiment of the disclosure, there is further provided a computer-readable storage medium, storing one or more modules executable by one or more processors, which when executed by one or more processors, cause the processors to carry out the method for networking and positioning as described above.

Please refer to the method for networking and positioning in the above-mentioned embodiments of this disclosure, for terms and principles related to a computer-readable storage medium in one of the optional embodiments of this disclosure, and which will not be repeatedly described here.

It should be noted that in this document, the terms "include/including", "comprise/comprising" or any other variant thereof are intended to cover non-exclusive inclusion, so that a process, a method, an article, or a system that includes a series of elements includes not only those elements, but also other elements that are not explicitly listed, or elements inherent to such process, method, article or system. Without further restrictions, the element defined by the sentence "including a . . . " does not exclude another identical element in the process, method, article, or system including the element as mentioned.

The serial numbers of the embodiments as described above are intended for description only, and do not represent the advantages or disadvantages of the embodiments.

From the description of the above embodiments, it is apparent to a person having ordinary skills in the art that the method of the above embodiments can be implemented by means of software with necessary general hardware platform, or by hardware, of course, but in many cases, the former is the better practice. Based on this understanding, the technical solution of the present disclosure can be embodied in the form of software products, which are stored in a storage medium (such as ROM/RAM, magnetic disk, and optical disk) and include several instructions to cause a terminal (which can be a mobile phone, a computer, a server, an air conditioner or a network device, etc.) execute the methods described in various embodiments of the present disclosure.

The embodiments of the present disclosure have been described above with reference to the accompanying drawings, but the present disclosure is not limited to the above-mentioned detailed embodiments, which are only illustrative and not restrictive. Under the guidance of this disclosure, a person having ordinary skills in the art can make various alternations without departing from the purpose of this disclosure and the scope defined by the claims, all of which are within the protection of this disclosure.

The invention claimed is:

1. A method for networking and positioning, comprising:
acquiring, through Bluetooth communication, a Bluetooth broadcast positioning data by a positioning master base station in a preset positioning region, wherein the Bluetooth broadcast positioning data is used for networking and positioning of a positioning beacon, and wherein each of the positioning beacon and the positioning master base station is provided with a Bluetooth communication device, respectively; and
performing networking and positioning of the positioning beacon based on the Bluetooth broadcast positioning data, wherein performing networking and positioning of the positioning beacon comprises calculating an estimated phase period for networking based on the Bluetooth broadcast positioning data.

2. The method of claim 1, wherein before acquiring the Bluetooth broadcast positioning data by the positioning master base station in preset positioning region through Bluetooth communication, the method comprises:
scanning for and acquiring a respective broadcast signal of each of a plurality of master base stations in a preset range through the Bluetooth communication, wherein each of the broadcast signal comprises respective Bluetooth broadcast positioning data of each of the plurality of master base stations; and
determining the positioning master base station from the plurality of master base stations, and determining a coverage region of the positioning master base station as the preset positioning region, wherein the positioning master base station is one of the plurality of master base stations which has the strongest RSSI of the broadcast signal.

3. The method of claim 1, wherein the Bluetooth broadcast positioning data comprises an ID of the positioning master base station and an available positioning phase time interval, and wherein at least two slave base stations are included in the preset positioning region; and wherein performing networking and positioning of the positioning beacon based on the Bluetooth broadcast positioning data comprises:
calculating the estimated phase period for networking based on the ID of the positioning master base station;
transmitting a request for networking to the positioning master base station during the estimated phase period for networking, so as to perform networking within the available positioning phase time interval; and
measuring and calculating a distance between the positioning beacon and the positioning master base station to position the positioning beacon in the preset positioning region.

4. The method of claim 3, wherein performing networking within the available positioning phase time interval comprises,
acquiring a recorded duration of information transmission and reception as the positioning beacon interacts with the positioning master base station; and
performing the networking within the available positioning phase time interval by a preset networking algorithm.

5. The method of claim 4, wherein the preset networking algorithm comprises a time-of-flight (TOF) positioning and ranging method.

6. The method of claim 3, wherein the ID of the positioning master base station and an ID of each slave base station are unique and are not identical with each other; and wherein measuring and calculating the distance between the positioning beacon and the positioning master base station to position the positioning the positioning beacon in the preset positioning region comprises:
sequentially transmitting a ranging request signal to the positioning master base station and a respective one of the at least two slave base stations based on the ID of the positioning master base station and the ID of each slave base station respectively;
acquiring (i) a first distance between the positioning beacon and the positioning master base station based on a feedback signal responding to the ranging request signal from the positioning master base station, and (ii) a second distance between the positioning beacon and a respective one of the at least two slave base stations based on a feedback signal responding to the ranging request signal from the respective one of the at least two slave base stations; and
transmitting the first distance and the second distance to the positioning master base station, so as to enable the positioning master base station to perform a calculation with the first distance and the second distance to acquire a positioning coordinate of the positioning beacon.

7. The method of claim 6, wherein subsequent to acquiring first distance between the positioning beacon and the positioning master base station based on feedback signal responding to the ranging request signal from the positioning master base station, the method further comprises:
preforming a determination as to whether the first distance is greater than a preset threshold;
in response to a determination that the first distance is greater than preset threshold, determining that the positioning beacon is out of the preset region and releasing the available positioning phase time interval; and
in response to a determination that the first distance is no more than the preset threshold, transmitting the first distance and the second distance to the master base station to acquire a positioning coordinate of the positioning beacon.

8. A system for networking and positioning, comprising,
an acquisition module configured to acquire Bluetooth broadcast positioning data by a positioning master base station in a preset positioning region through Bluetooth communication, wherein the Bluetooth broadcast positioning data is used for networking and positioning of a positioning beacon, and wherein each of the positioning beacon and the positioning master base station is provided with a Bluetooth communication device, respectively; and
a networking and positioning module configured to perform networking and positioning of the positioning beacon based on the Bluetooth broadcast positioning data, wherein performing networking and positioning of the positioning beacon comprises calculating an estimated phase period for networking based on the Bluetooth broadcast positioning data.

9. An electronic device, comprising a processor, and a memory configured to store a computer instruction which when executed by the processor, causes the processor to carry out the method of claim 1.

10. A non-transitory computer-readable storage medium storing at least one program executable by at least one processor, wherein the at least one program, when executed by the processor, causes the processor to carry out the method of claim 1.

* * * * *